United States Patent [19]

Jairazbhoy et al.

[11] Patent Number: 5,685,475
[45] Date of Patent: Nov. 11, 1997

[54] APPARATUS FOR COOLING PRINTED CIRCUIT BOARDS IN WAVE SOLDERING

[75] Inventors: Vivek Amir Jairazbhoy, Farmington Hills; Andrew Z. Glovatsky, Ypsilanti; Timothy Joseph Yerdon, Belleville, all of Mich.

[73] Assignee: Ford Motor Company, Dearborn, Mich.

[21] Appl. No.: 524,662

[22] Filed: Sep. 8, 1995

[51] Int. Cl.⁶ .................................................. B23K 3/00
[52] U.S. Cl. ............................... 228/37; 228/42; 228/46
[58] Field of Search ........................... 228/37, 42, 20.1, 228/46, 222

[56] References Cited

U.S. PATENT DOCUMENTS

| | | | |
|---|---|---|---|
| 3,579,853 | 5/1971 | Martino | 34/218 |
| 3,724,418 | 4/1973 | McLain | 228/37 |
| 4,361,967 | 12/1982 | Bahnsen et al. | 34/151 |
| 4,390,120 | 6/1983 | Broyer | 228/180 R |
| 4,679,720 | 7/1987 | Sedrick, Jr. et al. | 228/20 |
| 4,921,156 | 5/1990 | Hohnerlein | 228/37 |
| 5,141,147 | 8/1992 | Yokota | 228/219 |
| 5,240,169 | 8/1993 | Gileta | 228/37 |
| 5,388,752 | 2/1995 | Kawakatsu | 228/37 |

FOREIGN PATENT DOCUMENTS

| | | |
|---|---|---|
| 1 190 095 | 7/1985 | Canada ............ 228/37 |
| 0681418 | 4/1995 | European Pat. Off. . |
| 3611180C1 | 1/1987 | Germany . |
| 87002698 | 4/1987 | Germany . |
| 3843191C1 | 3/1990 | Germany . |
| 2181084 | 4/1987 | United Kingdom . |

*Primary Examiner*—Samuel M. Heinrich
*Attorney, Agent, or Firm*—Joseph W. Malleck; Roger L. May

[57] ABSTRACT

An apparatus and method for soldering components to a circuit board. The apparatus includes a conveyor in a tunnel for transporting the board through a preheat zone, molten waves of solder including a turbulent wave and a laminar wave, and a cool down zone through which the board passes upon exit from the laminar flow wave of the solder wave. The improvement comprises at least one distributing manifold mounted in the tunnel having an inlet port for receiving a cold gas under pressure and at least one outlet nozzle for directing the cold gas to the circuit board, thereby rapidly cooling the circuit board and the components.

17 Claims, 3 Drawing Sheets

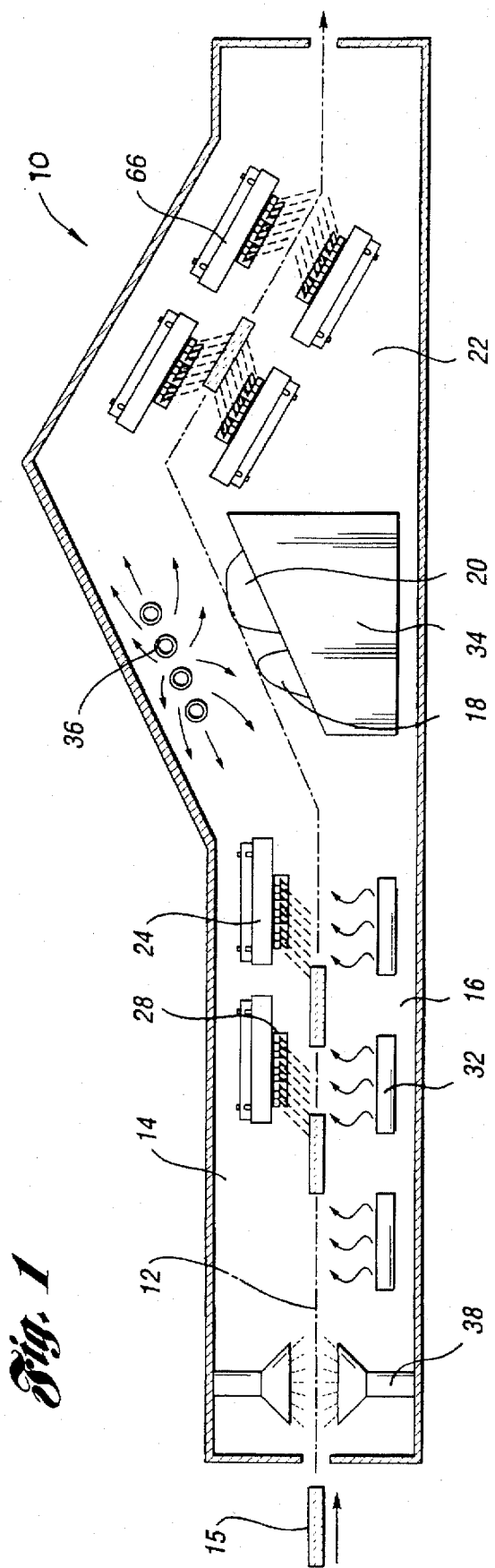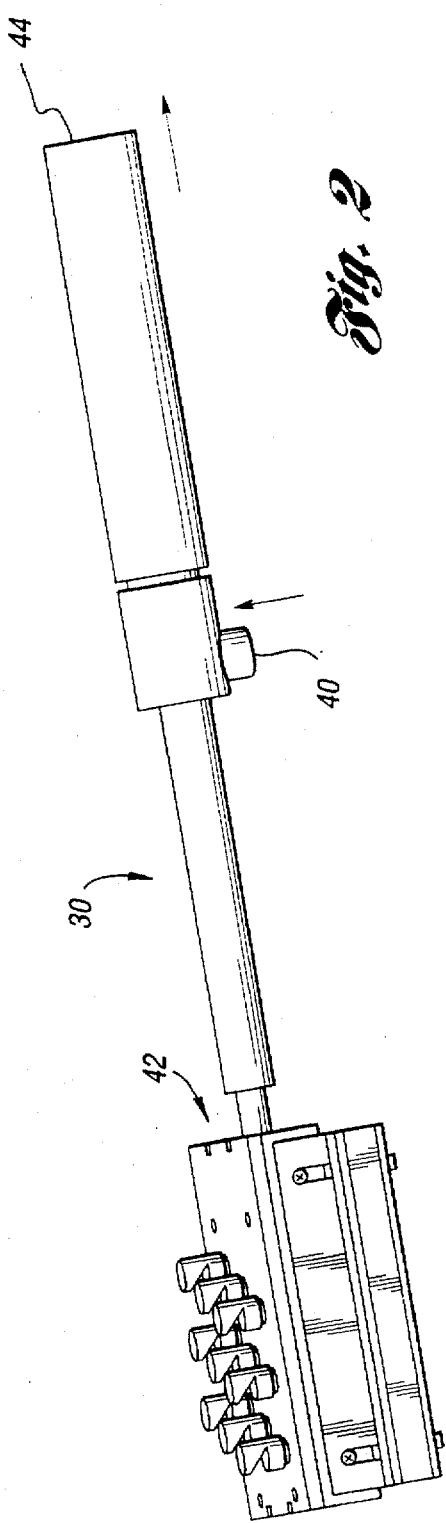

APPARATUS FOR COOLING PRINTED CIRCUIT BOARDS IN WAVE SOLDERING

TECHNICAL FIELD

This invention relates to a wave soldering apparatus for manufacturing circuit boards. More specifically, the invention relates to a device for cooling circuit boards prior to and after mechanical soldering of electrical components to such boards.

BACKGROUND ART

In wave soldering, as a circuit board passes through a wave, it experiences high temperatures for a few seconds. The ability of heat-sensitive components to withstand high temperatures is related to the duration over which a temperature spike is applied. If excessive heat is applied for prolonged periods, components could suffer damage. Prior to passing through the wave, the board is heated to minimize thermal shock. When using higher temperature solder alloys, the preheat zone is also heated to the higher preheat values. This also contributes to damaging components.

Higher temperature solders require higher wave temperatures. Thus, a migration to high temperature solders for environmental and reliability reasons places new temperature constraints on wave soldering. Components can withstand such elevated temperatures for only a brief period. Accordingly, it would be desirable to lower board and component temperatures rapidly after soldering in order to provide a clean, maintenance-free, energy-efficient means of cooling, with minimal additional inert gas requirement.

Illustrative of prior approaches is U.S. Pat. No. 4,361,967. However, that reference does not disclose cooling before exposure to the soldering wave.

SUMMARY OF THE INVENTION

The wave soldering apparatus of the present invention is used to solder components to a circuit board. Conventionally, the apparatus includes a conveyor situated in a tunnel for transporting the board through a pre-heat zone, a molten wave of solder including a turbulent region and a laminar flow region, and a cool down zone through which the board passes upon exit from the laminar flow region of the solder wave.

Mounted in the tunnel is at least one distributing manifold or plenum. Each manifold has an inlet port for receiving a cold gas under pressure and at least one outlet nozzle for directing the cold gas to a hot surface of the circuit board, thereby rapidly cooling the circuit board and the components.

The present invention also includes a method for soldering components using the disclosed apparatus.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a schematic cross-sectional view of a soldering apparatus according to the present invention;

FIG. 2 is a perspective view of an underside of a distributing manifold situated within the soldering apparatus, and a vortex cooling device for generating a cooled gas stream and supplying it to the distributing manifold and a warm stream for augmenting a supply of inert gas within the soldering apparatus;

BEST MODES FOR CARRYING OUT THE INVENTION

Figure 3:
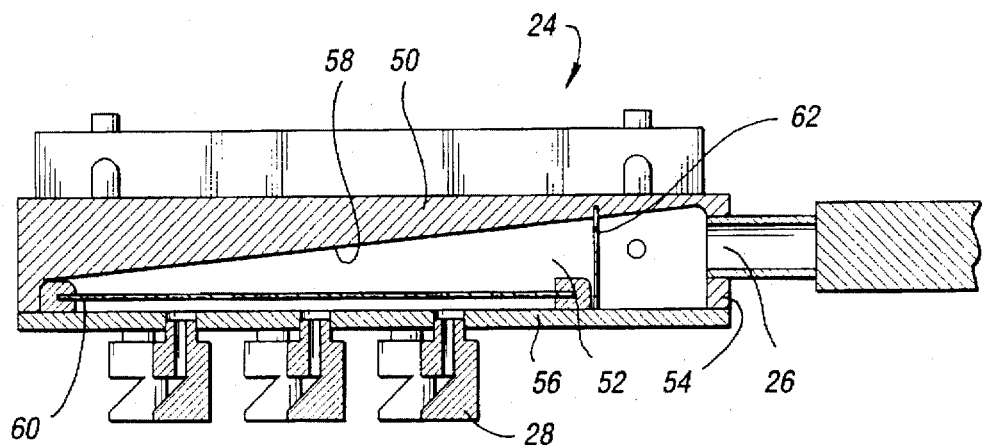
FIG. 3 is a cross-sectional view of a distributing manifold.

Turning first to FIG. 1 of the drawing, there is depicted a wave soldering apparatus 10 for soldering components to a circuit board 15. Conventionally, the apparatus includes a conveyor 12 situated in a tunnel 14 for transporting the board 15 through a pre-heat zone 16. The pre-heat zone 16 includes one or more heaters 32 located below the conveyor 12. Each distributing manifold 24 is mounted in the tunnel 14 above the conveyor 12 in the pre-heat zone 16. Preferably, each distributing manifold 24 is mounted within 0.5–6.0 inches of the circuit board's surface. From there, the board 15 passes through two molten waves of solder emerging from a solder pot 34. The waves include a turbulent wave 18 and a laminar flow wave 20. Thereafter, the board passes through a cool down zone 22.

Before passing through the turbulent wave 18, the board passes through a spray flux unit 38 and heaters 32 which deliver thermal energy to an underside of the circuit board 15 before it engages the turbulent and laminar flow waves 18,20 of the solder pot.

To avoid potentially damaging high temperatures to which heat-sensitive components which are mounted on the circuit board are exposed, at least one distributing manifold or plenum 24 is mounted in the tunnel 14. Each manifold 24 has an inlet port 26 (FIG. 3) for receiving a cold gas under pressure. The cold gas emerges from the distributing manifold 24 through at least one outlet nozzle 28 for directing the cold gas to the circuit board, thereby rapidly cooling the circuit board and the components. In this manner, the cold effluent from each outlet nozzle 28 functions as a cold gas knife.

Continuing with reference to FIG. 1, it can be seen that in one embodiment of the wave soldering apparatus disclosed, there are two distributing manifolds 24 within the pre-heat zone 16. If desired, to supplement the delivery of cooling to the circuit board, one or more distributing manifolds 66 are mounted in the tunnel 14 in the cool down zone. Those manifolds 66 may be mounted either above or below, or both above and below, the conveyor 12 and the circuit board. Optionally, the manifold 66 may cool the bottom side of the circuit board 15 after solder reflow.

FIG. 1 depicts a configuration of the wave soldering apparatus wherein the least one distributing manifold 66 is mounted in the tunnel 14 adjacent the exit from the laminar flow wave 20 of the solder wave. Care is needed in locating the at least one distributing manifold 66 so that it does not freeze or chill the solder waves. In practice, about 12 inches of separation between the laminar wave and the manifold 66 is sufficient. Thus, the distributing manifold(s) situated in the cool down zone effectively cool solder joints quickly, thereby promoting a small grain size and consequent improvement in fatigue properties. Typical cooling rates amount to about 2°–10° C. per second.

As depicted in FIG. 2, the cold gas is furnished by a vortex cooling device 30. The vortex device of FIG. 2 conventionally includes a vortex tube having an inlet 40 which receives compressed air, typically at about 70° F. through the vortex tube inlet 40. Incoming air is delivered to a vortex-generation chamber from which cold air emerges through a cooled stream 42, typically at about −50° F. Warm air exhausts from the vortex warm outlet 44, typically at about 200° F. A suitable vortex tube is available from ITW Vortec, Cincinnati, Ohio. Other suitable devices are available from EXAIR Corporation, also Cincinnati, Ohio. Such designs operate on the vortex principle of fluid rotating about an axis. The vortex tube creates a vortex from compressed air and separates it into two streams—one hot and one cold.

In operation, compressed air or an inert gas enters a cylindrical generator that is proportionally larger than the hot (long) tube, where it causes the air to rotate. Rotating air is forced down the inner walls of hot tube at speeds reaching 1,000,000 rpm.

At the end of the hot tube, a small portion of this air exits through a needle valve as hot air exhaust. The remaining air is forced back to the center of the incoming air stream at a slower speed. The heat from the slower moving air is transferred to the faster moving incoming air. The super-cooled air flows through the center of the generator and exits through the cold air exhaust port 42. The result is that air up to 250° F. emerges from one end of the tube and air at about −50° F. emerges from the other end. The tube operates on filtered factory compressed air at about 100 psig and 70° F. Preferably, gas is supplied to the vortex cooling device 30 at a pressure of approximately 10–120 psig.

Such vortex cooling devices represent means for converting a supply of gas entering the device through a vortex tube inlet 40. Such gas is converted into a cooled stream which is delivered to the inlet port 26 (FIG. 3) of the distributing manifold 24 and a heated stream delivered from the vortex warm exhaust outlet port 44 (FIG. 2) to augment an inert gas flow 36 within the tunnel, thereby minimizing oxidation of the solder. Typically used inert gases include nitrogen, argon, and carbon dioxide.

Thus, the warm stream replenishes inert gas entering the system, thereby effectively using heat and the inert gas.

During initial testing with regular room temperature gas passing through these distributing manifolds, warm gas from the plenum chamber when coupled with the entrained gas in the tunnel effectively increase the heating of a top side of the circuit board. This feature of the invention has utility in heating large thermally-dense components on the circuit board, or the circuit board itself. In some configurations in which large parts or large components are involved, temperature rise does not occur as quickly as with smaller parts. Accordingly, the invention has the attribute of augmenting heat supply to a top side of a circuit board if desired.

Under various conditions, a temperature drop of 70° F. has been observed between the temperature of gas entering and leaving the vortex cooling device 30.

As shown in FIG. 1, the cooled gas emerges from the at least one outlet nozzle 28 to define a spray pattern which is directed toward the circuit board. If desired, the nozzle configuration can be selected so as to control or direct the spray pattern 46 (FIG. 5) to specific areas, or to an entire surface of the circuit board 15.

Figure 5:
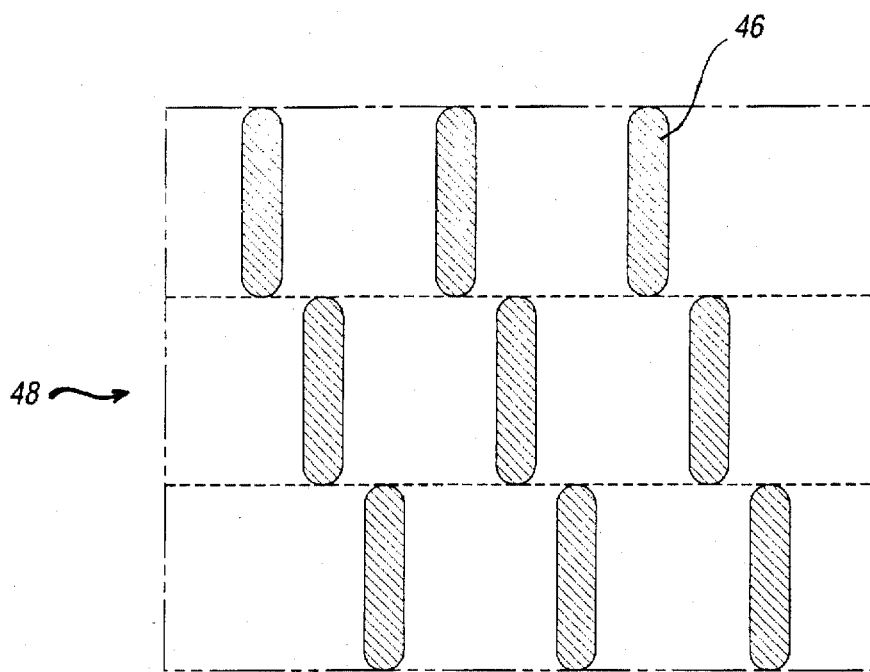
FIG. 5 depicts a spray pattern generated by outlet nozzles associated with a distributing manifold.
Figure 6:
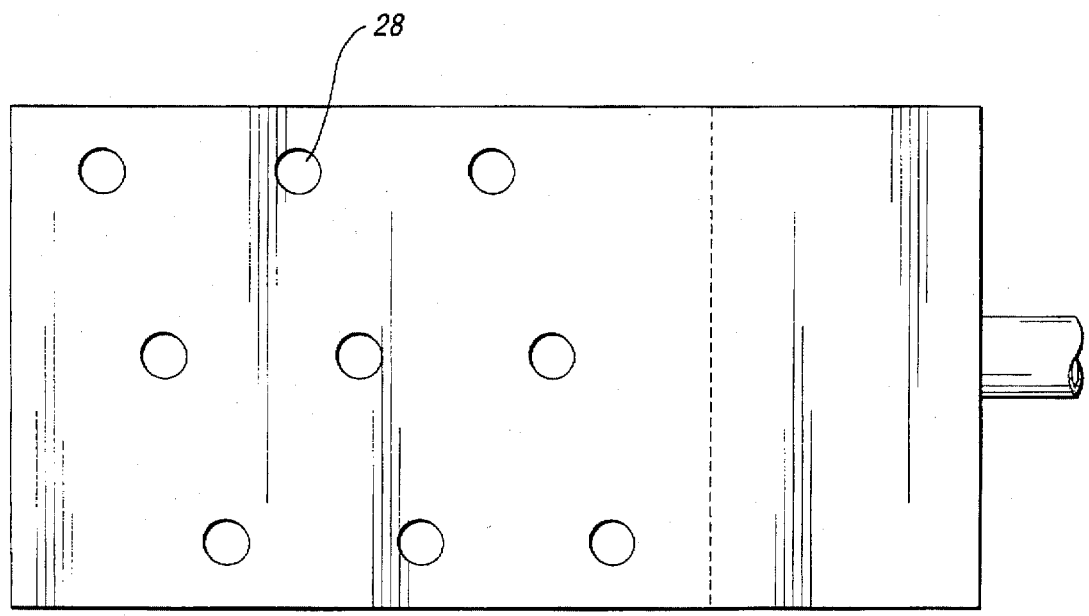
FIG. 6 is a bottom plan view of a distributing manifold depicting the location of outlet nozzles which generate the spray pattern of FIG. 5.

Turning now with primary attention to FIGS. 5–6, the at least one outlet nozzle 28 comprises three rows of outlet nozzles. Each row has three nozzles. Each nozzle projects a shaped volume of gas upon a surface of the circuit board. Depending on the nozzle selected, the shaped volume may be generally elliptical, as shown, or rectangular, if desired. In this way, the volume of gas projected from each nozzle projects an array of shaped distribution patterns (FIG. 5) which impinge upon the circuit board.

Returning to FIG. 3, each distributing manifold 24 may be provided with hollow walls 50 which define a space through which coolant may pass to maintain refrigeration or thermal insulation of gas passing through a central chamber 52 of the distributing manifold 24. Alternatively, a vacuum can be drawn to act as a thermal barrier to protect the central chamber 52 from being heated by high tunnel temperatures.

Figure 4:
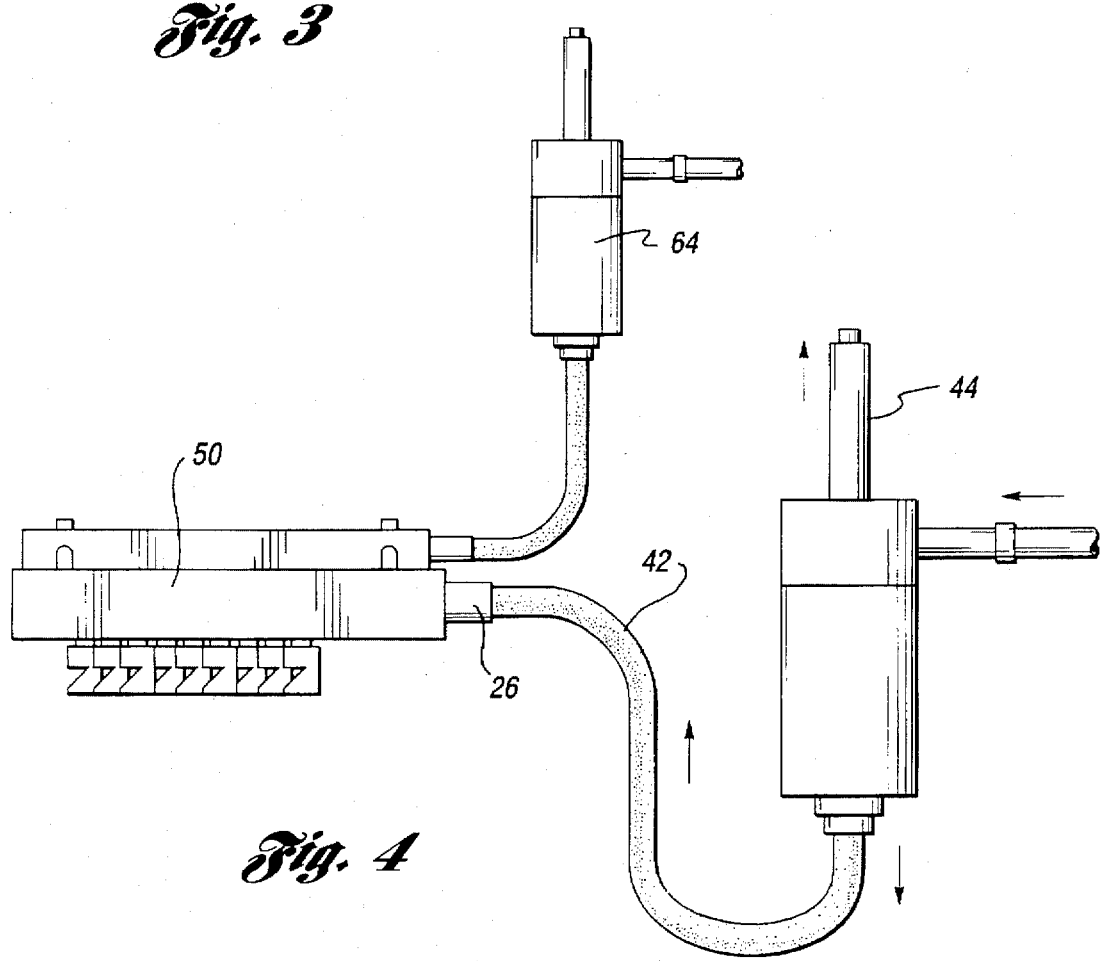
FIG. 4 depicts an alternative embodiment of the disclosed invention.

Turning now to FIG. 4, the wave soldering apparatus 10, in an alternative embodiment, may include a second vortex cooling device 64 which is connected to the hollow wall 50 of the distributing manifold 24 for supplying cool air to a jacketing chamber about the plenum to prevent external heat from affecting the cold spray within the plenum.

As illustrated in FIG. 3, each of the at least one distributing manifolds 24 has a central chamber 52 defined by walls 50, a floor to which the at least one outlet nozzle 28 is secured, and a sloping roof 58. The sloping roof 58 is inclined downwardly in relation to a wall 54 which is provided with the inlet port 26 to promote uniformity of pressure distribution throughout the chamber 52 of gas prior to emergence from the at least one outlet nozzle 28.

If desired, gas distribution screens may be provided within the manifold. As illustrated in FIG. 3, a gas distribution screen 60 is provided generally parallel to the floor 56. Alternatively, or in addition, a gas distribution screen is provided at an angle to the floor, such as orthogonal thereto.

As best seen in FIGS. 1 and 3, at least one outlet nozzle 28 directs the cold gas to the heated surface of the circuit board in a direction which is inclined thereto at an acute angle and against the direction of movement of the board 15 along the conveyor 12 in the tunnel 14.

In operation, the disclosed apparatus includes process steps comprising:

providing a distributing manifold having an inlet port for receiving cold gas under pressure;

connecting a source of the cold gas to the inlet port; and distributing the cold gas from the manifold outwardly through at least one outlet nozzle so that the effluent of cold gas spreads as it leaves the nozzle, thereby rapidly cooling the circuit board and the components.

While the best mode for carrying out the invention has been described in detail, those familiar with the art to which this invention relates will recognize various alternative designs and embodiments for practicing the invention as defined by the following claims.

What is claimed is:

1. In an apparatus for soldering components to a circuit board, the apparatus having a conveyor in a tunnel for transporting the board through a preheat zone, molten waves of solder including a turbulent wave and a laminar wave, and a cool down zone through which the board passes upon exit from the laminar flow wave of the solder wave, an improvement comprising:

at least one distributing manifold mounted in the tunnel above the conveyor having an inlet port for receiving a cold gas under pressure and at least one outlet nozzle for directing the cold gas downwardly to the circuit board, the distributing manifold providing a uniform gas pressure at each nozzle, thereby rapidly cooling the circuit board and the components.

2. The apparatus of claim 1 further comprising:
a vortex-cooling device connected to the inlet port of the distributing manifold for supplying the cold gas under pressure.

3. The apparatus of claim 1, wherein the preheat zone includes one or more heaters located below the conveyor, and each distributing manifold is mounted in the tunnel above the conveyor in the preheat zone.

4. The apparatus of claim 1, wherein the at least one distributing manifold comprises two distributing manifolds mounted in the preheat zone.

5. The apparatus of claim 1, wherein the at least one distributing manifold is mounted in the tunnel in the cool down zone.

6. The apparatus of claim 2, wherein the at least one distributing manifold is mounted in the tunnel in the preheat zone adjacent the exit from the laminar flow wave of the solder wave.

7. The apparatus of claim 2, wherein the vortex cooling device includes means for converting a supply of gas entering the device through a vortex tube inlet into a cooled stream which is delivered to the inlet port of the distributing manifold and a heated stream for augmenting an inerting gas flow within the tunnel to minimize oxidation of the solder.

8. The apparatus of claim 7, wherein the gas is supplied to the vortex cooling device at a pressure of approximately 10–120 psig.

9. The apparatus of claim 8, wherein the cooled gas stream has a temperature at or above 70° C. below the temperature of gas supplied to the vortex cooling device.

10. The apparatus of claim 1, wherein the cooled gas emerges from the at least one outlet nozzle to define a spray pattern directed toward the circuit board.

11. The apparatus of claim 10, wherein the at least one outlet nozzle comprises three rows of outlet nozzles, each row having three nozzles, each nozzle projecting a shaped volume of gas which impinges upon the circuit board, whereby the volume of gas projected from the nozzle projects an array of shaped distribution patterns.

12. The apparatus of claim 1, wherein the at least one distributing manifold is provided with hollow walls which define a space through which a coolant may pass to maintain refrigeration of gas passing through a central chamber of the distributing manifold.

13. The apparatus of claim 1, wherein each of the at least one distributing manifolds has a central chamber defined by walls, a floor to which the at least one outlet nozzle is secured, and a sloping roof, the roof sloping downwardly in relation to a wall which is provided with the inlet port to promote uniformity of pressure distribution throughout the chamber of gas prior to emergence from the at least one outlet nozzle.

14. The apparatus of claim 13 further including:
a gas distribution screen provided within the chamber, the screen lying parallel to the floor.

15. The apparatus of claim 13 further including:
a gas distribution screen provided within the chamber, the screen being oriented at right angles in relation to the floor.

16. The apparatus of claim 1, wherein the at least one outlet nozzle directs the cold gas to the heated surface of the circuit board in a direction which is inclined at an acute angle and against the direction of movement of the board along the conveyor in the tunnel.

17. The apparatus of claim 12 further including a second vortex cooling device which is connected to the hollow wall of the distributing manifold for supplying cold air thereto.

* * * * *